July 4, 1967 C. E. JOHNSON 3,329,039
MANUALLY CONTROLLED TRANSMISSION GEAR SHIFT ASSEMBLY
Filed May 10, 1965 3 Sheets-Sheet 1

INVENTOR:
CHARLES E. JOHNSON
BY
ATTORNEYS.

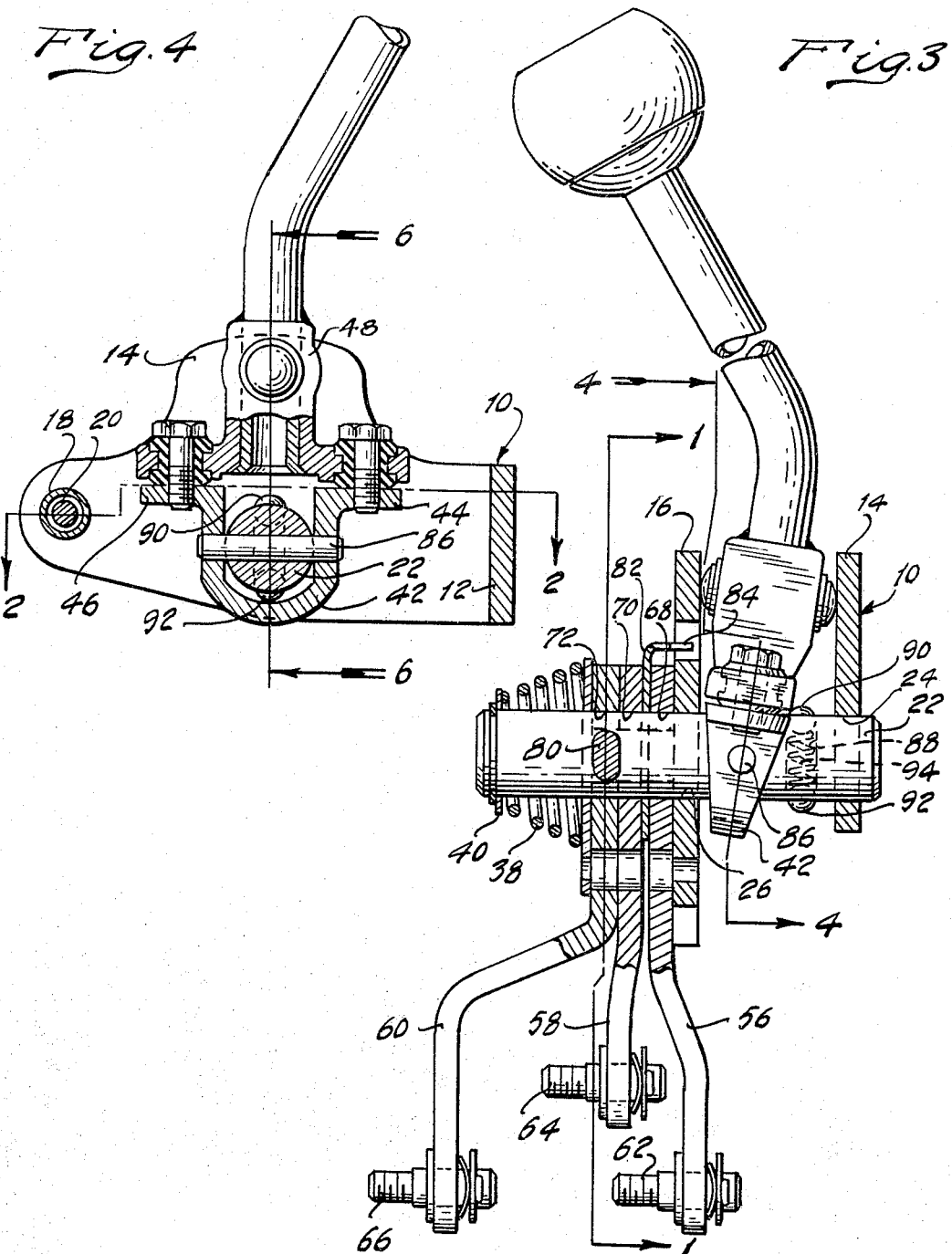

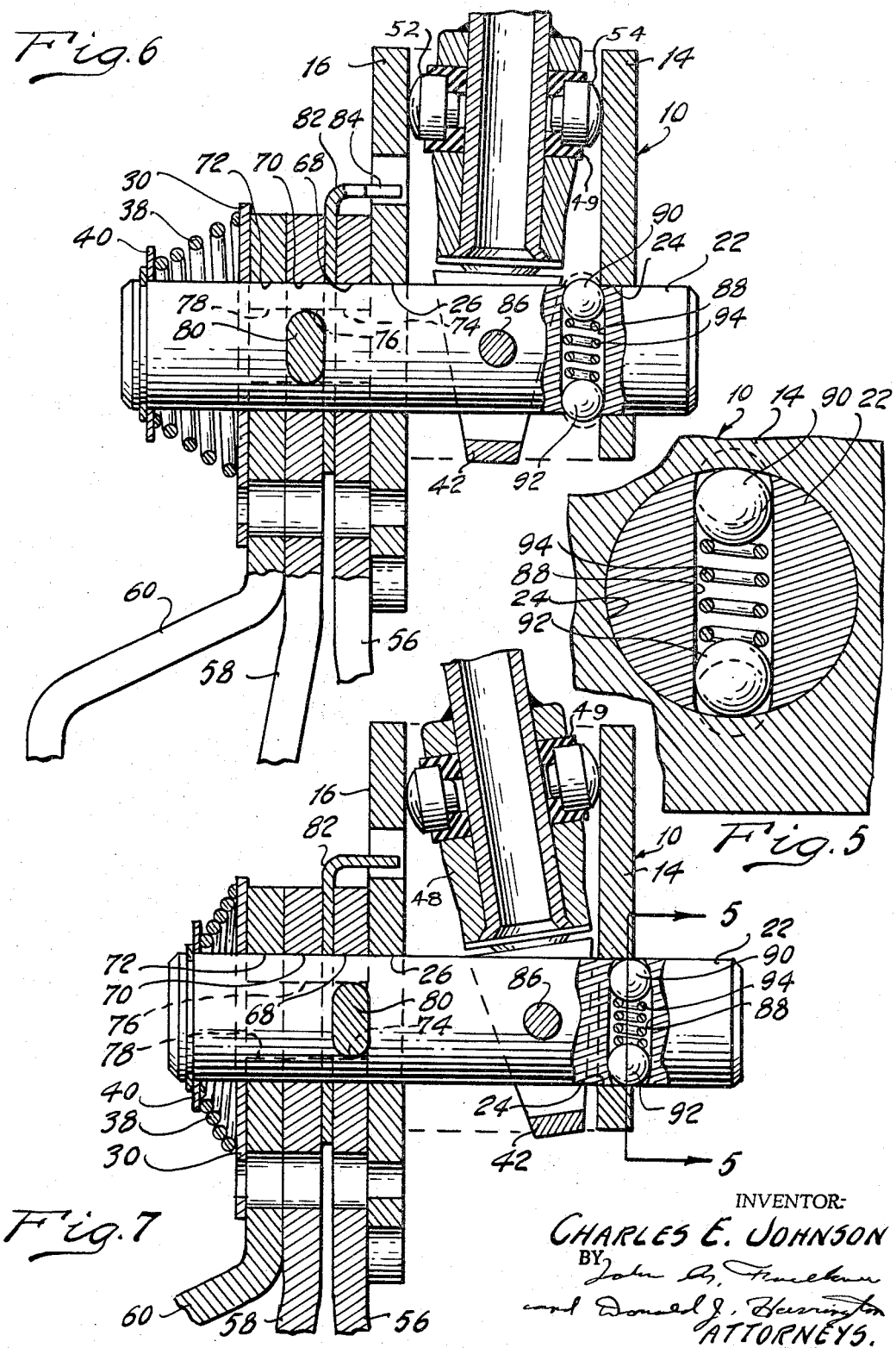

United States Patent Office 3,329,039
Patented July 4, 1967

3,329,039
MANUALLY CONTROLLED TRANSMISSION GEAR SHIFT ASSEMBLY
Charles E. Johnson, Wyandotte, Mich., assignor to Ford Motor Company, Dearborn, Mich., a corporation of Delaware
Filed May 10, 1965, Ser. No. 454,376
3 Claims. (Cl. 74—473)

ABSTRACT OF THE DISCLOSURE

This specification discloses a control linkage mechanism for a manually controlled multiple speed ratio power transmission. It includes linkage structure capable of shifting torque delivery elements in the transmission gearing to condition the mechanism for operation in any of several forward driving speed ratios or a single reverse speed ratio. A simplified, mechanical detent is included in the linkage mechanism to resist shifting movement of the control linkage to the reverse drive position.

Brief summary of the invention

My invention is an improvement in the transmission shift control linkage shown in Nilson Patent No. 3,082,-638, which is assigned to the assignee of my instant invention. The shift linkage of my invention is capable of being used with multiple speed ratio power transmission mechanisms having selectively engagable synchronizer clutches or sliding gears in a gear system. Such synchronizer clutch mechanisms or the sliding gears can be actuated appropriately to condition the mechanism for operation in a forward range of drive ratios or in a reverse drive ratio.

A preferred form of my invention includes a bracket assembly that may be connected externally to a transmission housing in a fixed fashion. A gear shift control rod is pivoted on a shift rod that in turn is carried by the bracket assembly. Shift levers supported by the shift rod are adapted to oscillate about the axis of the rod. The free ends of the levers are connected by means of a suitable mechanical linkage to gear shifter forks in the transmission assembly.

By suitably manipulating the control rod, the driver may cause the shift rod to shift either in an axial direction or in a rotary fashion. When it is shifted axially, a pin and key connection selectively establishes a driving connection between the various shift levers and the shift rod. Upon rotation of the shift rod, when it assumes any given axial position, the shift lever corresponding to that axial position can be actuated thereby causing an appropriate shifting movement of the corresponding gear shifter fork.

The improved linkage of my invention is capable of providing any one of several forward driving speed ratios in the transmission mechanism. It is capable also of providing a single reverse speed ratio as the shift lever corresponding to the reverse drive shifter fork is actuated.

It is undesirable to allow the transmission mechanism to shift into reverse drive position when the vehicle is in motion in a forward direction. For this reason, I have provided a shift inhibitor in my improved mechanism for preventing inadvertent shifting movement of the shift lever to the reverse drive position thereby making it impossible for the reverse drive gearing to assume a torque delivery condition when reverse drive is not desired. This inhibitor is in the form of a detent mechanism which increases the resistance to shifting movement of the shifter rod by the vehicle operator from either a neutral position or a forward driving position to the reverse position. Thus the vehicle operator must exert an increased shifting effort upon the control lever in order to condition the mechanism for reverse drive operation. This requirement for an additional shift effort will enable the operator to sense readily when the transmission mechanism is ready to be conditioned for reverse drive operation. Shifting movement of the shift lever to the reverse drive position then will not be completed until the driver exerts a conscious shifting effort on the control lever that is greater than the shift effort required to move the control lever into any one of the other drive ratio positions. A corresponding shifting effort is not required, however, to remove the shift lever from the reverse position as it is moved to the neutral position.

Reference may be made to the Nilson Patent No. 3,082,638, for a description of a structural environment for the gear shift linkage mechanism of my invention.

It is an object of my invention to provide a gear shift mechanism of the type generally described in the preceding paragraph wherein provision is made for establishing a detent feel or resistance as the operator shifts the control linkage to the reverse driving position thereby preventing inadvertent shifting movement of the transmission gearing into the reverse drive position.

It is a further object of my invention to provide a control linkage mechanism of the type set forth in the preceding paragraph, but wherein a detent feel is not experienced by the vehicle operator when the reverse drive torque delivery path is disestablished.

It is a further object of my invention to provide an improvement in a gear shift mechanism of the type above set forth which will inhibit automatically inadvertent shifting movement of the linkage mechanism to the reverse drive position.

Brief description of the figures of the drawings

FIGURE 3 is a cross sectional view taken along the plane of section line 3—3 of FIGURE 1;

FIGURE 4 is a cross sectional detail view of a portion of the mechanism shown in FIGURE 3 and is taken along section line 4—4 of FIGURES 2 and 3;

FIGURE 5 is a detail cross sectional view taken along the plane of section line 5—5 of FIGURE 7;

FIGURE 6 is a cross sectional view taken along the plane of section line 6—6 of FIGURE 4; and FIGURE 7 is a view similar to FIGURE 6 although the shift rod of FIGURE 6 is shown in FIGURE 7 in a reverse drive position.

Particular description of the invention

Figure 2:
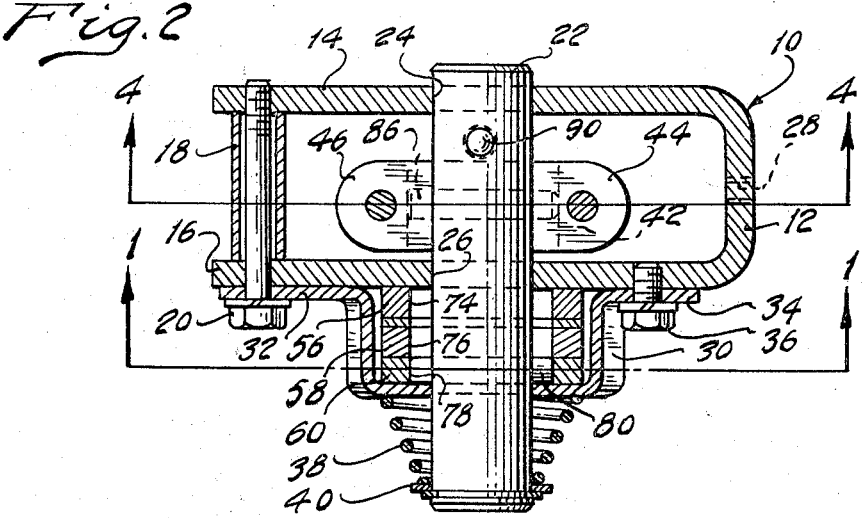
FIGURE 2 is a cross sectional view of the structure of FIGURE 1 as viewed along the plane of section line 2—2 of FIGURE 1.
Figure 1:
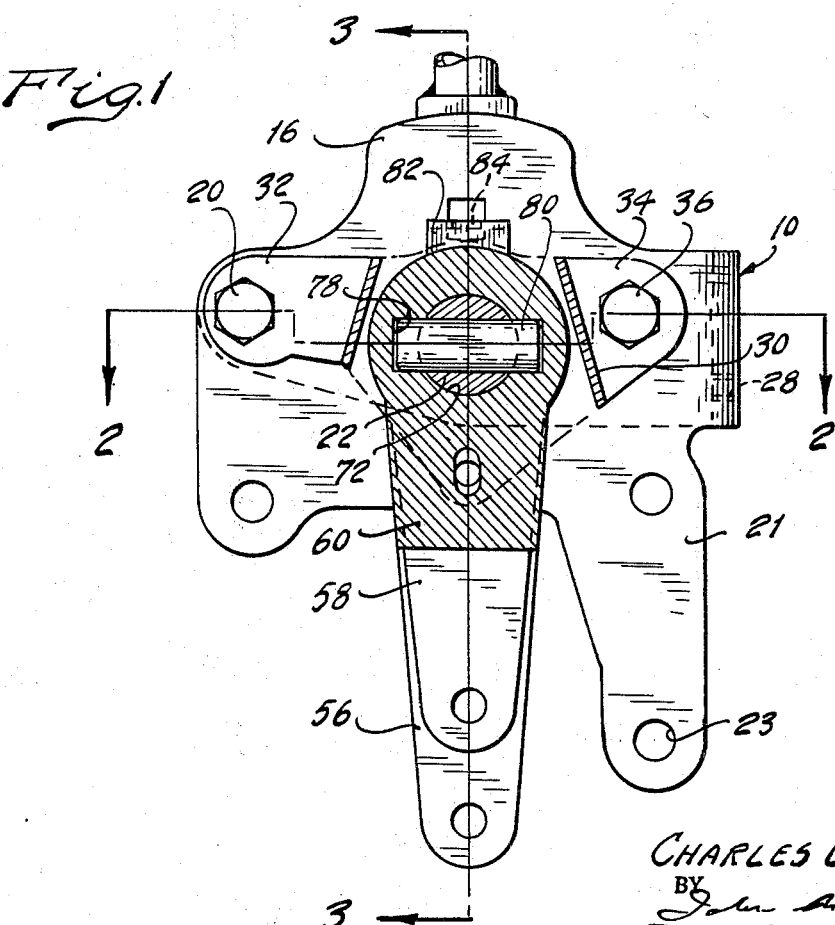
FIGURE 1 shows a partial sectional view of the improved shift linkage mechanism of my invention as viewed along section line 1—1 of FIGURE 2.

In the drawings, numeral 10 designates a bracket which is formed with a U-shape. It includes a base 12 and two leg or wall portions 14 and 16. The open end of the U-shaped bracket is straddled by a spacer 18 to provide rigidity. A bolt 20 received through the spacer 18 is threadably secured to portion 14.

Leg portion 16 includes a depending bracket element 21 which is formed with bolt openings 23 for accommodating mounting bolts. A gear shift selector shaft 22 is slidably positioned within aligned openings 24 and 26 formed in the leg portions 14 and 16 of the bracket assembly 10. Sufficient clearance is provided between the shaft 22 and these aligned openings to permit adjustment of the shaft in a plane perpendicular to the plane of the leg portion. In addition to the openings 23 there is provided a threaded opening 28 formed in the base 12 of the bracket assembly 10 for receiving a threaded mounting bolt.

A shift lever cover 30 is bolted to the exterior of the leg portion 16. It is formed with flanges 32 and 34 through which are received the bolt 20 and a second clamping bolt 36. A compression spring 38 is situated between the cover 34 and a spring seat 40, the latter being secured to one end of the shaft 22 by means of a snap ring.

Spring 38 exerts normally a force on the shaft 22 to urge it in a left-hand direction as viewed in FIGURE 3. A U-shaped bracket 42 is situated between the leg portions 14 and 16 of the bracket assembly 10. It straddles shaft 22, as best indicated in FIGURE 4. It includes flanges 44 and 46 which register with cooperating flanges on a pedestal 48 for a shift control lever. The pedestal 48 is formed with crowned portions 52 and 54 which are received within cooperating recesses in the pedestal 48. Rubber-like insulators 49 surround the crowned portions 52 and 54 so that they are urged normally into engagement with the leg portions 16 and 14, respectively, of the bracket assembly 10. The pedestal 48 is secured to the flanges 44 and 46 by bolts as indicated.

Pivotably carried by shaft 22 are three shift levers 56, 58 and 60. These respectively form a part of the linkage for the reverse drive gear elements, the first and second speed ratio gear elements, and the third and fourth speed ratio gear elements. Each lever 56, 58 and 60 carries at its free end a pivot shaft, as shown at 62, 64 and 66 respectively. These shafts may be received through suitable eyelets in the transmission shift linkage elements.

The levers 56, 58 and 60 are formed with openings 68, 70 and 72 through which the shaft 22 extends. These openings 68, 70 and 72 are formed with keyways, as indicated in FIGURE 2 by reference characters 74, 76 and 78. Shaft 22 is formed with a transverse opening within which is situated a selector key in the form of a pin 80.

The two ends of the pin 80 are received within the keyways 74, 76 and 78. When the shift levers 56, 58 and 60 assume the neutral position, the keyways are aligned. At this time the pin 80 is free to move through the keyways as shaft 22 is shifted axially.

If the shaft 22 is rotated about its axis, either one lever or another will be caused to rotate by reason of the driving connection of that shift lever to the shaft 22.

A bushing in the form of a washer 82 is disposed between the pivoted ends of the levers 56 and 58. The washer 82 is prevented from rotating by a tab 84 that is received within a cooperative opening formed in the leg portion 16 of the bracket assembly 10.

Movement of the lever 56 will not cause movement of the lever 58, and vice versa. A transmission interlock system prevents simultaneous movement of levers 58 and 60.

The compound motion of the shaft 22 is accomplished by the driver controlled lever 50. A pin connection between the U-shaped bracket 42 and shaft 22 permits the operator to move the shaft 22 in an axial direction as the crowned portions 52 and 54 act as fulcrums. The pin connection is formed by a pin 86 received in a transverse opening formed in the shaft 22 and through aligned openings formed in the U-shaped bracket 42. Rotary motion of the shaft 22 is accomplished by moving the control lever 50 so that crowned portions thereof slide through the leg portions 14 and 16.

Formed also in the shaft 22 is a ball type reverse lockout comprising an opening 88 formed transversely in the shaft 22. Disposed in opening 88 is a pair of ball bearings 90 and 92. These ball bearings are urged radially outwardly by an internal compression spring 94 situated within the opening 88.

The periphery of the opening 88 at each end thereof, is staked-over thereby preventing removal of the ball bearings 90 and 92 when the shaft 22 assumes the position shown in the drawings.

When the shaft 22 is shifted by the vehicle operator to a position that will establish a connection between shaft 22 and reverse shift lever 56. The ball bearings 90 and 92 are received with opening 24 formed in the leg portion 14. The resistance of the spring 94 thus must be overcome before shaft 22 can be shifted to the reverse drive position. But no detent resistance or feel is provided when the lockout mechanism shown in FIGURE 5 when the shaft 22 is shifted to a position corresponding to that which is illustrated in the drawings or to a position that will establish a keyed connection between shafts 22 and lever 58.

The existence of the detent feel at a time prior to shifting movement of the shaft 22 to reverse speed ratio shift position avoids the problem of inadvertent engagement of the reverse drive gearing. The driver must exert a conscious effort upon the control lever 50 in order to overcome the resistance of the spring 94 as the shaft 22 is shifted in a right-hand direction as viewed in FIGURE 3.

Having thus described a preferred embodiment of my invention, what I claim and desire to secure by U.S. Letters Patent is:

1. In a gear shift mechanism for a multiple speed ratio manually controlled transmission a transmission control lever having fulcrum portions intermediate its ends, a bracket having a pair of parallel wall portions, a selector shaft slidably situated within aligned openings formed in said bracket portions, shift levers pivoted on said selector shaft, one end of each of said shift levers being adapted to be connected to shift controlling portions of said transmission, means for connecting said selector shaft to each of said levers as said control lever is shifted in the direction of its axis and a spring loaded detent means having detent portions carried by said selector shaft adjacent one opening of said wall portions for creating a detent feel as said selector shaft is shifted in the direction of its axis to one extreme position, and a pin connection between one end of said control lever and said selector shaft whereby the latter may be rotated about its axis and shifted in the direction of its axis by appropriately manipulating said control lever, said detent means comprising a transverse opening formed in said selector shaft, a compression spring in said transverse opening, a ball located at each of the two ends of said transverse opening, said compression spring engaging said balls and urging them radially outwardly, said balls being urged radially inwardly against opposing force of said compression spring as they are moved through the opening in one of said wall portions when said selector shaft is shifted to a position that will establish the reverse speed ratio.

2. In a gear shift mechanism for a manually controlled multiple speed ratio power transmission mechanism having speed ratio controllers adapted to condition said mechanism for multiple forward driving speed ratios and a single reverse drive speed ratio, a mounting bracket having leg portions secured to a stationary portion of said transmission mechanism, a selector shaft slidably received through aligned openings formed in said leg portions, shift levers pivotally mounted upon said selector shaft, one end of each of said shaft levers being connected to said speed ratio controllers whereby one shift lever establishes and disestablishes a reverse drive torque delivery path and each of the other shift levers establishes and disestablishes a separate one of said forward drive torque delivery paths, means for connecting selectively said selector shaft to each of said shift levers upon shifting movement of said selector shaft in the direction of its axis whereby said shift levers may be rotated selectively, a control lever having fulcrum portions intermediate its ends, one end of said control lever being pinned to said selector shaft, said fulcrum portions being engagable with said leg portions, and detent means for imparting a resistance to shifting movement of said selector shaft as said selector shaft is moved by the control lever to a poition that will establish a connection with the shift lever for reverse drive ratio control, said detent means comprising a transverse opening formed in said selector shaft, a compression spring in said transverse opening, a ball located at each of the two ends of said transverse opening, said compression spring engaging said balls and urging them radially outwardly, said balls being urged radially inwardly against opposing force of said compression spring as they are moved through the opening in one of said leg portions when said selector shaft is shifted to a position that will establish reverse speed ratio control.

3. A control mechanism for changing the ratios of a multiple speed ratio manually controlled power transmission mechanism comprising a bracket secured to a stationary portion of said transmission mechanism, said bracket having parallel leg portions, a selector shaft slidably received through aligned openings formed in said leg portions, a control lever pinned to said selector shaft and extending through said leg portions, fulcrum portions of said control lever being engagable with said leg portions, shift levers carried on one outward side of said bracket, spring means for normally biasing said selector shaft in one direction, means for establishing selectively a mechanical connection between said selector shaft and each of said control levers upon axial shifting movement of said selector shaft, one end of each of said shift levers being adapted to be connected to a transmission ratio controller, and a spring loaded detent means for providing a controlled resistance to shifting movement of said selector shaft in the other direction to an extreme position corresponding to the position that will establish a mechanical connection between said selector shaft and the shift lever for reverse speed ratio control, said detent means comprising a transverse opening formed in said selector shaft, a compression spring in said transverse opening, a ball located at each of the two ends of said transverse opening, said compression spring engaging said balls and urging them radially outwardly, said balls being urged radially inwardly against opposing force of said compression spring as they are moved through the opening in one of said leg portions when said selector shaft is shifted to a position that will establish reverse speed ratio control.

References Cited

UNITED STATES PATENTS

| | | | |
|---|---|---|---|
| 2,078,474 | 4/1937 | Watson | 74—475 |
| 2,922,315 | 1/1960 | Primeau | 74—473 |
| 3,082,638 | 3/1963 | Nilson | 74—476 X |
| 3,164,030 | 1/1965 | Fodrea et al. | 74—476 |

MILTON KAUFMAN, *Primary Examiner.*